United States Patent [19]

Wecke et al.

[11] Patent Number: 5,653,059
[45] Date of Patent: Aug. 5, 1997

[54] HOUSING STRUCTURE

[75] Inventors: Rolf Wecke, Bückeburg; Jürgen Weiss, Lübbecke, both of Germany

[73] Assignee: Bernstein Classic GmbH & Co., Porta Westfalica, Germany

[21] Appl. No.: 555,922

[22] Filed: Nov. 13, 1995

[30] Foreign Application Priority Data

Nov. 17, 1994 [DE] Germany ................... 9418391 U

[51] Int. Cl.⁶ .......................... E05D 15/00; E06B 3/34
[52] U.S. Cl. ........................ 49/381; 16/260; 49/397
[58] Field of Search .................... 49/381, 397, 398; 16/260, 268; 312/326, 329, 138.1

[56] References Cited

U.S. PATENT DOCUMENTS 4,629,265 12/1986 Chester ..................... 312/329

*Primary Examiner*—Brian K. Green
*Assistant Examiner*—Curtis A. Cohen
*Attorney, Agent, or Firm*—Henry M. Feiereisen

[57] ABSTRACT

A housing structure, includes a compartment body formed by interconnecting side walls and a door, and hook-shaped hinges for articulating the door to one side wall. The side wall is formed with a groove which extends longitudinally from top to bottom. Each hook-shaped hinge exhibits an angled section and extends through a slot of the door for engagement in the groove, with the angled section of the hinge at least partially overlapping a marginal area adjoining an outer edge of the door.

6 Claims, 1 Drawing Sheet

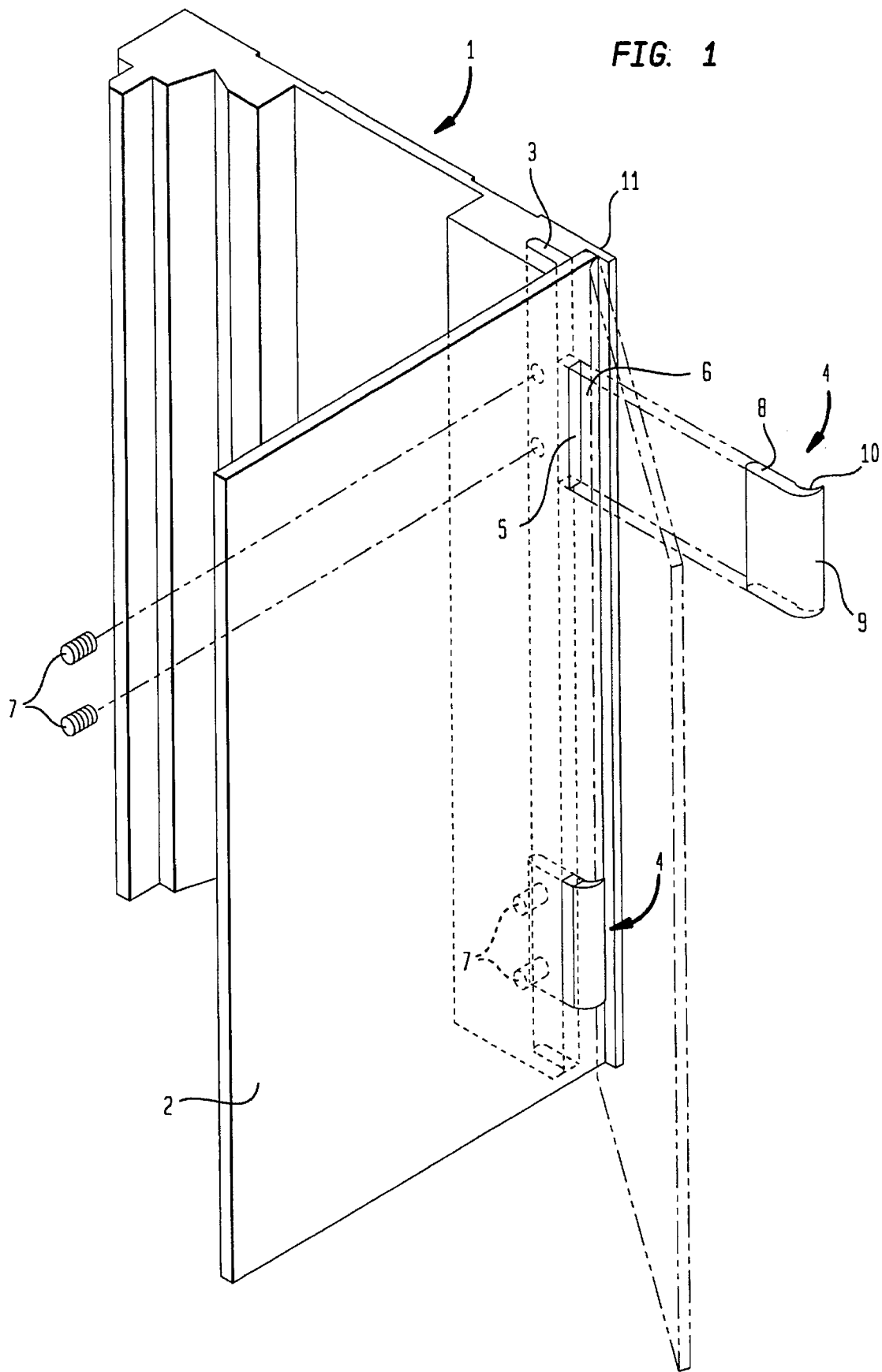

HOUSING STRUCTURE

BACKGROUND OF THE INVENTION

The present invention refers to a housing structure, and in particular to a housing structure that exhibits a compartment body formed by interconnecting side walls and a door that is articulated to one side wall.

Such housing structures are formed by side walls, which are preferably made of light metal, and used for example as control box which is part of a machine and incorporates the respective electrical control mechanism. In order to allow easy access to the electrical control mechanism, the housing structure exhibits a door which normally forms the rear of the control box as the front panel exhibits the operating elements.

In general, the door is secured unilaterally to a side wall by hinges of multipart configuration. These hinges may include pins which guide eyelets, lugs or the like, and is bolted to the door as well as to the side wall. A drawback of these conventional hinges is their relative complex structure which renders them cost-intensive. In addition, also the assembly of the conventional hinges is complicated as a precisely fitted attachment upon the door and upon the pertaining side wall is required.

SUMMARY OF THE INVENTION

It is an object of the present invention to provide an improved housing structure, obviating the aforestated drawbacks.

In particular, it is an object of the present invention to provide an improved housing structure by which the hinges can be made and assembled in a simpler and more cost-efficient manner.

These objects and others which will become apparent hereinafter are attained in accordance with the present invention by forming the hinge-proximate side wall with a groove that runs longitudinally from top to bottom and receives angled hook-shaped hinges which are introduced through respective slots of the door and at least partially overlap with their angled section a marginal area adjacent an outer edge of the door.

This configuration enables a manufacture of single-piece hinges so that the production becomes very cost-efficient especially when making the hinges of light metal through extrusion by forcing light metal through an orifice of a die to produce a continuously formed, extrusion profile of desired cross section, which is cut to length to provide respectively profiled sections that form the hinges. In the event the housing is made of light metal, the side walls can also be formed in a same manner as the hinges through extrusion to provide extrusion profiles which have the desired shape and already have formed therein the groove. Thus, an additional process step to finish the side walls is eliminated.

Suitably, the hinge is of substantially L-shaped configuration, with the groove-engaging section of the hinges having a thickness which corresponds to the width of the groove so that the hinges can easily be introduced through the slots into the groove.

Preferably, the hinges are secured in the groove by screw fasteners or pins which extend through the groove-forming wall surface of the side wall and bear upon the groove-engaging hinge section. As the hinge can be inserted into the groove at any suitable location, there is no need to form the slots in the door at a precise position so that the overall manufacture of the housing is further facilitated.

According to another feature of the present invention, the corner transition between the angled section and the groove-engaging section of the hinge is rounded in form of a fillet to improve a swinging of the door.

BRIEF DESCRIPTION OF THE DRAWING

The above and other objects, features and advantages of the present invention will now be described in more detail with reference to the accompanying drawing in which the sole FIG. 1 shows a perspective view, partially in exploded illustration, of one embodiment of a housing structure according to the present invention.

DETAILED DESCRIPTION OF A PREFERRED EMBODIMENT

Turning now to FIG. 1, there is shown a perspective view, partially in exploded illustration, of one embodiment of a housing structure according to the present invention, including a side wall 1 which forms part of a compartment body for defining an interior. Secured to the side wall 1 is a door 2 for allowing access to and closing of the compartment body. The door 2 is articulated to the side wall 1 by hook-shaped hinges 4 of substantially L-shaped configuration to exhibit a long section 8 and a short section 9 that is angled from the long section 8. The long section 8 of the hinge 4 is introduced through a slot 5 of the door 2 and is received in a groove 3 that runs longitudinally from top to bottom in the side wall 1 in immediate proximity of the outer edge of the side wall 1 that faces the door 2. Screw fasteners 7, such as set screws, secure the hinges 4 in the groove 3 by traversing respective bores in the groove-forming wall surface of the side wall 1 and bearing upon the hinge section 8.

The short angled section 9 of the hinge 4 is exposed on the outside and is directed towards the outer edge of the door 2 to overlap at least partially the adjoining marginal area 6 of the door 2. In order to prevent a detachment of the door 2 from the hook-shaped hinge 4 in opened position, as shown in FIG. 1 in dashdot line, the side wall 1 exhibits a support surface 11 in the area of the groove 3 which substantially extends flush with the angled section 9 of the hinge 4. The clear distance between the support surface 11 and the hinge 4 corresponds substantially to the thickness of the door 2 so that a swinging of the door 2 is ensured.

To further improve the swinging capability of the door 2 relative to the side wall 1, the corner in the transition area between the section 8 and the section 9 in proximity of the marginal area 6 is concavely shaped in form of a fillet 10 for allowing swing of the door 2 therein.

Since the hook-shaped hinges 4 are almost invisible regardless whether the door 2 is open or closed, the overall optical appearance of the housing is substantially enhanced.

The single-piece hinges 4 can be made through very cost-efficient production, e.g. through extrusion by forcing light metal through an orifice of a die (not shown) to produce a continuously formed extrusion profile of desired cross section, which is cut to length to provide respectively profiled sections that form the hinges 4. In the event the housing is also made of light metal, the side walls can also be formed in a same manner as the hinges through extrusion to provide extrusion profiles which have a desired shape and already have formed therein the groove 3.

While the invention has been illustrated and described as embodied in a housing structure, it is not intended to be limited to the details shown since various modifications and structural changes may be made without departing in any way from the spirit of the present invention.

What is claimed as new and desired to be protected by Letters Patent is set forth in the appended claims:

1. A housing structure, comprising:

a compartment body formed by interconnecting side walls and a door, said body defining an axis; and connecting means for articulating said door to one of said side walls, one side wall having an axial length and having a groove extending longitudinally substantially over the entire length;

said connecting means including a single-piece hook-shaped hinge exhibiting an angled section and extending through a slot of said door for engagement in said groove to effect a connection between said one side wall and said door whereby the hinge remains stationary during opening and closing of the door, said angled section of said hinge at least partially overlapping a marginal area adjacent an outer edge of said door.

2. The housing structure of claim 1 wherein said hook-shaped hinge made through extrusion to form an extrusion profile of desired cross section which is cut to length.

3. The housing structure of claim 1 wherein said door has a thickness, said one side wall having a support surface adjacent said groove and exhibiting a width substantially corresponding to the thickness of said door.

4. The housing structure of claim 3 wherein the angled section has an outside surface, said support surface exhibiting an outer edge that is substantially flush with the outside surface of the angled section of said hook-shaped hinge.

5. The housing structure of claim 1, and further comprising fastening means extending through a groove-forming wall surface of said one side wall for securing said hook-shaped hinge upon said one side wall.

6. The housing structure of claim 1 wherein said hook-shaped hinge exhibits a corner which faces the marginal area and is formed as fillet.

* * * * *